Patented Apr. 17, 1934

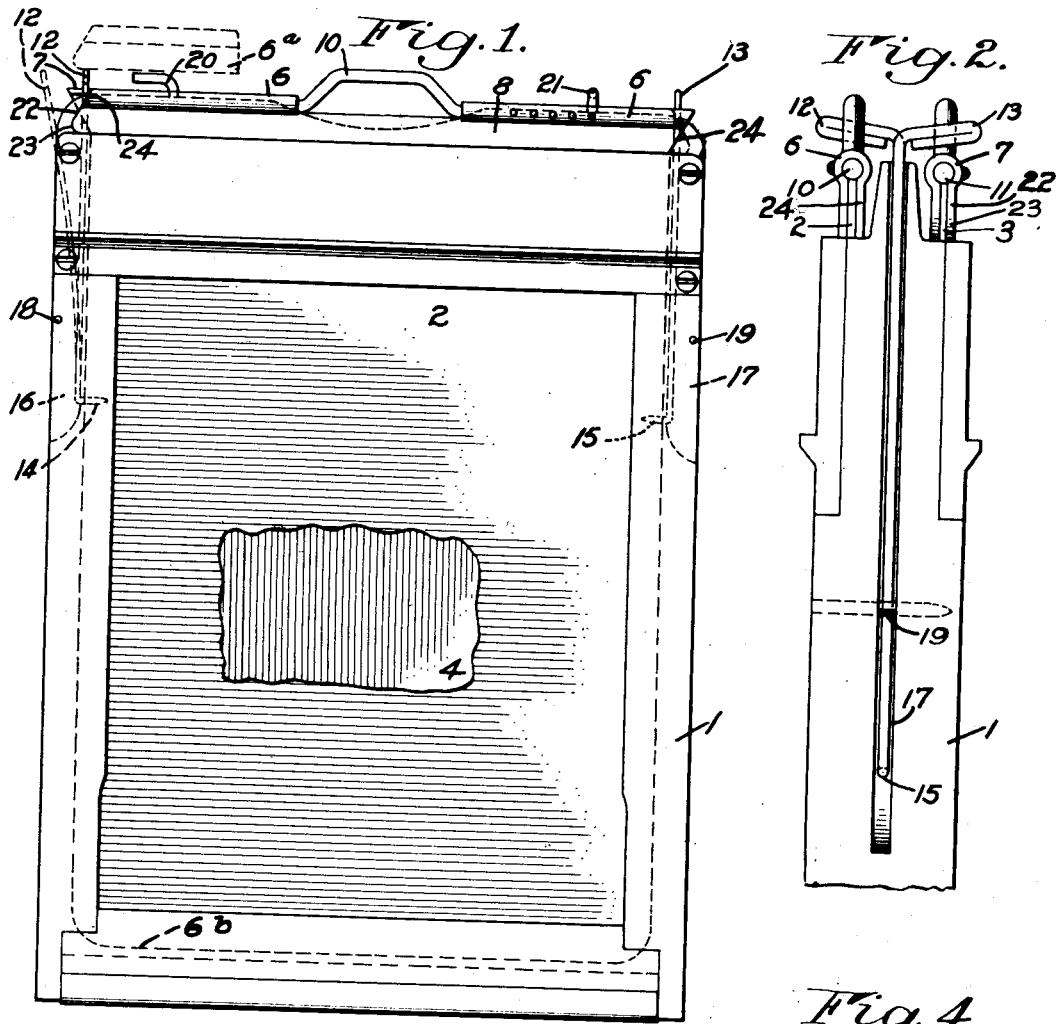
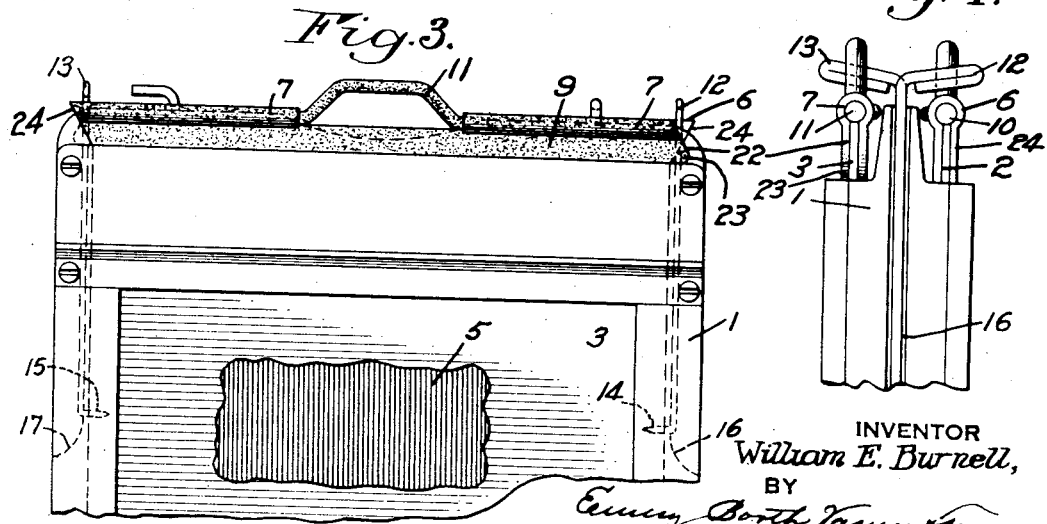

1,954,917

UNITED STATES PATENT OFFICE 1,954,917

MEANS TO PREVENT DOUBLE EXPOSURES IN USING PLATE OR FILM HOLDERS FOR CAMERAS

William E. Burnell, Penn Yan, N. Y.

Application September 3, 1932, Serial No. 631,671

15 Claims. (Cl. 95—71)

This invention relates to means for preventin double exposures when using plate or film holders for cameras of any description.

In order that the principle of the invention may be readily understood, I have disclosed a single embodiment only of the invention, constituting the preferred form thereof but to which my invention is in no wise restricted.

In the drawing,—

Fig. 1 is a side elevation of one form of plate or film holder, certain of the parts being indicated in dotted lines, the slide being represented in full lines as pushed fully into covering position over an unexposed plate therein indicated, and in dotted lines as not pushed fully into covering position;

Fig. 2 is an edge view of the construction shown in Fig. 1, the lower end of the plate holder being broken away;

Fig. 3 is a view in side elevation of the upper part of the plate holder representing the slide as properly positioned to cover an exposed plate or film therein indicated; and Fig. 4 is a view in side elevation of the construction shown in Fig. 3.

My invention has for its broad purpose the provision of means to prevent double exposure of a plate or film in photography. Therefore, my invention is not limited to use in any particular form or type of holder for the plate or film. It is therefore immaterial whether the invention be practised in connection with a holder containing one plate or film only, or a plurality thereof. I have chosen, however, to illustrate my invention as applied to an ordinary type of plate or film holder adapted to receive a single plate or film at each face or side thereof, each plate or film to be covered by a slide. In the event that a film is employed, I would preferably provide a sheath to receive the film, the sheath with the film being placed in the holder in the usual manner.

An ordinary holder is represented at 1, in the several figures, it being of wood or other suitable material. Inasmuch as the holder is represented as of a duplex type, it is provided with two slides 2, 3 respectively. The illustration in Fig. 3 may be regarded either as a view of the holder from the opposite side from Fig. 1, or as representing the slide of Fig. 1 as returned to position after exposure of the plate, but for convenience of description Figs. 1 and 3 will be referred to as views at opposite sides of the holder.

In Fig. 1 the unexposed plate is indicated at 4, the slide being partly broken away for this purpose. The exposed plate is represented at 5 in Fig. 3, the slide 3 being represented as partly broken away for this purpose. Each slide 2, 3, has opposite contrasting faces. Such contrast may be provided in any suitable manner well known in the art and therefore not requiring detailed description. I have for convenience represented the upper transversely extending edge 6 of the slide 2 and the upper transversely extending edge 7 of the slide 3 as differently colored at their two faces respectively. For example, the said edges 6 and 7 may be of aluminum or other light metal suitably bent over and secured to the upper edges of the bodies of the slides 2 and 3. One face of each edge 6, 7 is preferably left of the natural aluminum color, as indicated at 8 in Fig. 1, and the other face coated by enameling or otherwise of some contrasting color as indicated at 9 in Fig. 3. Preferably a wire is received within the crimped or beaded portion of the edges 6, 7, as represented at 10 and 11, and the wire where exposed as a handle, as clearly shown in Figs. 1 and 3, is at its two sides of the color of the upper edges 6, 7 at the two faces thereof. Preferably the natural aluminum color is retained as at 8 to designate that the slide covers an unexposed plate and the black or other contrasting color 9 is used as represented in Fig. 3 to indicate that the slide covers an exposed plate.

In accordance with the broad scope and purpose of my invention I provide means to prevent (until further manipulation of the parts occurs) the slide from being pushed fully home when the slide is inserted over an unexposed plate, and I also provide means (which may be in part at least the means already referred to) to prevent the slide from being removed (until further manipulation of the parts occurs) after the slide has been fully inserted over an exposed plate. In other words, I provide means whereby the slide cannot readily or freely be pushed fully home over an unexposed plate if said slide is through error being inserted with the wrong face outermost, and I provide means whereby a slide covering an exposed plate cannot readily and freely be withdrawn without movement of some other part, thus attracting the user's attention to the fact that such plate has been exposed and therefore that the slide should not be withdrawn (except for purposes of removing the slide for developing the plate or film).

In the simplest embodiment of my invention, but which may be variously otherwise embodied, I provide an elongated or pin-like spring member for and embedded in or secured at each edge portion of the holder. The said two members are represented at 12, 13 in the several figures, being represented partly in full lines and partly in dotted lines in Figs. 1 and 3, the member 12 in Fig. 1 being indicated in full lines at its upper end as in functioning position and in its flexed non-functioning position in dotted lines its entire length. The said members 12 and 13 are represented as having their lower bent sharpened ends 14, 15 driven into the substance of the holder. The holder is longitudinally slotted or recessed for a suitable portion of its length from the top downwardly, as indicated at 16, 17, for the reception of the two members 12, 13, and said members are represented as provided with heads which are extended oppositely from each other, as clearly indicated in Figs. 2 and 4. Such headed formations may be provided in any suitable way as by bending over the upper end of the members 12, 13. Preferably also pins 18, 19 are driven through the holder, crossing the recesses 16, 17, to prevent the members 12, 13 from being flexed outwardly too much.

It will be understood that the usual means may be provided to prevent either slide from being withdrawn until the means is displaced. For this purpose I have represented the usual turn pins 20, 21 with bent upper ends, suitably socketed in the upper edge of the holder near opposite edges thereof, and adapted in one position to overlie the respective slides and in the other position to permit the withdrawal thereof.

Viewing Figs. 1 and 3, it will be observed that each of the transversely extending edges 6, 7 for the respective slides 2, 3 is contrastingly shaped at its two ends. Referring to Fig. 1, wherein the transverse edge 6 is shown, and wherein the slide is positioned over an unexposed plate, said edge portion 6 at its left hand end is beveled or inclined upwardly and inwardly as indicated at 22, preferably but not necessarily leaving a slightly rounded corner 23, and there constituting an overhanging portion. At its opposite or right hand end viewing Fig. 1 the said transversely extending edge portion 6 is upwardly and outwardly inclined or beveled as indicated at 24. In Fig. 1 there is shown in dotted lines the end formation of the transversely extending edge 7 for the other slide 3, and at the upper part of Fig. 1 the edge portion 6 is partly indicated in dotted lines at 6a as not pushed fully home. That the said slide 2 is not pushed fully home is also indicated by the dotted line 6b at the bottom of Fig. 1.

Each pin-like member 12, 13 is of such resiliency that it tends normally to return to an upright position, shown in part in full lines in Figs. 1 and 3, when flexed therefrom as indicated in dotted lines at the left in Fig. 1.

Having thus described the construction of parts, it will be assumed that the user has just placed an unexposed film or plate in one side of the holder. He will naturally place the slide over the unexposed plate with the white or aluminum face of the transversely extending edge 6 outermost and as he seeks to push the slide fully home the overhang provided by the corner 23 will strike the head of the pin-like member 12 and prevent the slide from being pushed fully home. The user will therefore deflect the pin-like member 12 and push the slide fully home. Now let it be assumed that an exposure has been made of the same plate and just following that exposure the user carelessly attempts to restore the slide with the white or aluminum face 8 of the transversely extending edge 6 outermost.

The same overhang provided at the corner 23 will prevent the slide from being pushed fully home without the outward flexing of the pin-like member 12, and since the user has just made an exposure he will instantly realize his error and will withdraw the slide and reverse the same, whereupon the head of the pin-like member 12 will be automatically flexed outward by the outwardly inclined edge 24 and the slide will go easily and fully home and the head of the pin 12 will automatically assume a position over the extreme outer end of the edge portion 6.

Now let it be assumed with reference to Fig. 3 that a plate has been exposed and the slide 3 thereof has been properly positioned thereover, that is to say, with the black face 9 of the slide 7 outermost. In such condition of the parts the pin-like spring member 13 overlies the extreme end 24 of the transversely extending edge 7 at the right hand side of the holder viewing Fig. 3. If, now, the user should attempt to withdraw the slide 3 from over the exposed plate 5 for the mistaken purpose of making an exposure upon the already exposed plate, such withdrawal will be entirely prevented by the pin 13, and the user's attention will be drawn to the error which he was about to commit.

It will thus be seen that at each side or edge portion of the holder I have provided a single means serving as an indicator which will prevent a slide being pushed fully home over an unexposed plate if the wrong face of the slide is outermost, and which will prevent the slide from being withdrawn from over an exposed plate until that means has been moved, but my invention is not limited to the provision of a single means to accomplish both of said purposes.

Having thus described one illustrative embodiment of the invention, it is to be understood that although specific terms are employed, they are used in a generic and descriptive sense and not for purposes of limitation, the scope of the invention being set forth in the following claims.

I claim:

1. In a plate or film holder for cameras wherein each slide is provided with contrasting faces to indicate respectively non-exposure and exposure of the plate or film covered by said slide, indicating means adapted to engage the outer end or edge of the slide to prevent (until further manipulation of the parts occurs) the slide from being pushed fully home when the slide is inserted with the non-exposure indicating face outermost.

2. In a plate or film holder for cameras wherein each slide is provided with contrasting faces to indicate respectively non-exposure and exposure of the plate or film covered by said slide, means including a straight lateral prolongation of the outer end or edge of the slide, and a movable member to overlie the same, thereby to prevent the slide from being removed (until further manipulation of the parts occurs) after said slide has been fully inserted with the exposure indicating face outermost.

3. In a plate or film holder for cameras wherein each slide is provided with contrasting faces to indicate respectively non-exposure and exposure of the plate or film covered by said slide, a device carried by the holder and adapted to engage the outer edge of the slide and serving to prevent said slide from being pushed fully home when being inserted with the non-exposure indicating side outermost, and serving also to prevent said slide from being removed, after having been inserted with the exposure indicating face outermost, without manipulation of said device.

4. In a plate or film holder for cameras wherein each slide is provided with contrasting faces to indicate respectively non-exposure and exposure of the plate or film covered by said slide, a device mounted upon the holder and adapted to cooperate with (engage with) the outer edge of the slide to prevent said slide from being pushed fully home when being inserted with the non-exposure indicating side outermost, until said device has been moved from its normal position.

5. In a plate or film holder for cameras wherein each slide is provided with contrasting faces to indicate respectively non-exposure and exposure of the plate or film covered by said slide, a device mounted upon the holder and adapted to overlie the outer edge of the slide to prevent said slide from being removed, after having been inserted with the exposure indicating face outermost, until said device has been moved from its normal position.

6. In a plate or film holder for cameras wherein each slide is provided with contrasting faces to indicate respectively non-exposure and exposure of the plate or film covered by said slide, a movable device mounted upon the holder to engage the outer edge of the slide, said outer edge of the slide having a special formation for such engagement with the holder, the construction and relation of the parts being such that the slide cannot be pushed fully home, when being inserted, without said device being moved to permit the passage of the engaging portion of the slide, and cannot be withdrawn (after having been inserted with the exposure indicating side outermost) without said device being moved to permit such withdrawal.

7. In a plate or film holder for cameras wherein each slide is provided with contrasting faces to indicate respectively non-exposure and exposure of the plate or film covered by said slide, a movable device mounted upon the holder near the slide receiving end thereof and adapted to engage the outer end of the slide, said outer end of the slide being shaped at one edge to prevent the slide from being pushed fully home without withdrawal movement of said device.

8. In a plate or film holder for cameras wherein each slide is provided with contrasting faces to indicate respectively non-exposure and exposure of the plate or film covered by said slide, a movable device mounted upon the holder near the slide receiving end thereof and adapted to engage the outer end of the slide, said outer end of the slide being shaped at one edge to prevent the slide from being removed without withdrawal movement of said device.

9. In a plate or film holder for cameras wherein each slide is provided with contrasting faces to indicate respectively non-exposure and exposure of the plate or film covered by said slide, a movable device mounted upon the holder near the slide receiving end thereof and adapted to engage the outer end of the slide, said outer end of the slide being shaped at one edge to prevent the slide from being pushed fully home without withdrawal movement of said device, and being shaped at the other edge thereof to prevent the slide from being removed without withdrawal movement of said device.

10. In a plate or film holder for cameras wherein each slide is provided with contrasting faces to indicate respectively non-exposure and exposure of the plate or film covered by said slide, a movable device mounted upon the holder near the slide receiving end thereof and adapted to engage the outer end of the slide, the said outer end of the slide having one edge laterally prolonged to overlie said device when the slide is being inserted, and having the other edge laterally prolonged to underlie said device when the slide (after exposure) is grasped for attempted removal.

11. In a plate or film holder for cameras wherein each slide is provided with contrasting faces to indicate respectively non-exposure and exposure of the plate or film covered by said slide, a movable device mounted upon the holder near the slide receiving end thereof and adapted to engage the outer end of the slide, said outer end of the slide having one edge laterally prolonged to underlie said device when the slide (after exposure) is grasped for attempted removal.

12. In a plate or film holder for cameras wherein each slide is provided with contrasting faces to indicate respectively non-exposure and exposure of the plate or film covered by said slide, an elongated pin-like spring member secured in the holder and having a protruding end to engage the outer end of the slide, the said outer end of the slide having one edge laterally prolonged to overlie said member when the slide is being inserted, and having the other edge laterally prolonged to underlie said member when the slide (after exposure) is grasped for attempted removal.

13. In a plate or film holder for cameras wherein each slide is provided with contrasting faces to indicate respectively non-exposure and exposure of the plate or film covered by said slide, an elongated pin-like spring member secured in the holder and having a protruding end to engage the outer end of the slide, said outer end of the slide having one edge laterally prolonged to underlie said member when the slide (after exposure) is grasped for attempted removal.

14. In a plate or film holder for cameras wherein each slide is provided with contrasting faces to indicate respectively non-exposure and exposure of the plate or film covered by said slide, a pin-like spring member 12 and a slide, the transverse edge portion 6 whereof is provided with contrastingly shaped ends with which said pin-like member cooperates either to prevent removal of the slide from over an exposed plate or to prevent the slide temporarily from being pushed wholly home over an unexposed plate.

15. In a plate or film holder for cameras wherein each slide is provided with contrasting faces to indicate respectively non-exposure and exposure of the plate or film covered by said slide, two spring-like members 12, 13 secured in the opposite edge portions of the holder, each slide having a transverse outer edge, one end of which is inwardly and upwardly beveled and the other end of which is outwardly and upwardly beveled for cooperation with said members 12, 13.

WILLIAM E. BURNELL.